United States Patent
Nabors, Jr. et al.

(10) Patent No.: US 10,513,453 B2
(45) Date of Patent: Dec. 24, 2019

(54) OXYGEN-FUEL BURNER FOR A GLASS MELTING FURNACE

(71) Applicant: Air Products and Chemicals, Inc., Allentown, PA (US)

(72) Inventors: James K Nabors, Jr., Longwood, FL (US); Abigail Nabors, Longwood, FL (US)

(73) Assignee: Air Products and Chemicals, Inc., Allentown, PA (US)

( * ) Notice: Subject to any disclaimer, the term of this patent is extended or adjusted under 35 U.S.C. 154(b) by 341 days.

(21) Appl. No.: 15/663,137

(22) Filed: Jul. 28, 2017

(65) Prior Publication Data
US 2019/0031548 A1    Jan. 31, 2019

(51) Int. Cl.
*C03B 5/235* (2006.01)
(52) U.S. Cl.
CPC .................. *C03B 5/2353* (2013.01)
(58) Field of Classification Search
CPC ............... C03B 5/2353; C03B 2211/60; C03B 2211/40
USPC ...... 239/398, 407, 412, 416.4, 416.5, 417.3, 239/417.5, 418, 423, 424, 581.5; 431/8, 431/9
See application file for complete search history.

(56) References Cited

U.S. PATENT DOCUMENTS

| | | |
|---|---|---|
| 3,129,930 A | 4/1964 | Labat-Camy |
| 3,337,324 A | 8/1967 | Cable, Jr. et al. |
| 4,604,123 A | 8/1986 | Desprez et al. |
| 4,671,765 A | 6/1987 | Tsai |
| 4,816,056 A | 3/1989 | Tsai et al. |
| 5,139,558 A | 8/1992 | Lauwers |
| 5,302,112 A | 4/1994 | Nabors, Jr. et al. |
| 5,554,022 A | 9/1996 | Nabors, Jr. et al. |
| 5,863,195 A * | 1/1999 | Feldermann .......... F23D 11/106 431/10 |
| 6,237,369 B1 | 5/2001 | LeBlanc et al. |
| 6,422,041 B1 * | 7/2002 | Simpson ................. C03B 5/193 65/134.4 |
| 6,540,508 B1 | 4/2003 | Simpson et al. |
| 6,705,117 B2 | 3/2004 | Simpson et al. |
| 6,705,118 B2 | 3/2004 | Simpson et al. |
| 2014/0290643 A1 * | 10/2014 | Potter ..................... F23C 7/004 126/512 |

FOREIGN PATENT DOCUMENTS

IN            217434 A1    10/2008

* cited by examiner

*Primary Examiner* — Avinash A Savani
*Assistant Examiner* — Rabeeul I Zuberi
(74) *Attorney, Agent, or Firm* — Larry S. Zelson

(57) ABSTRACT

A roof mounted oxygen-fuel burner for a glass melting furnace can produce a variable moving or sweeping flame in the furnace and can also vary the flame shape. The burner has a housing having an oxygen inlet pipe coupled to an oxygen chamber and a fuel inlet pipe coupled to a fuel feeding crossover block. The fuel feeding block feeds fuel to a nozzle fuel port while the oxygen chamber feeds a plurality of nozzle oxygen ports which oxygen port outlets are angled toward the centralized fuel port outlet. A rotating impeller over the oxygen ports has a partial opening that causes a variable moving or sweeping flame in the burner as the impeller rotates. The impeller is also raised or lowered to control the flow of oxygen to the plurality of oxygen port outlets to control the shape of the burner flame.

14 Claims, 5 Drawing Sheets

OXYGEN-FUEL BURNER FOR A GLASS MELTING FURNACE

FIELD OF THE INVENTION

This invention relates to the use of an oxygen fuel burner in the roof of a glass melting furnace and especially to an oxygen fuel burner which has a variable shaped flame with a fixed or variable moving or sweeping motion in the furnace.

BACKGROUND OF THE INVENTION

In conventional continuous glass making processes, raw glass making materials are placed in one end of an elongated regenerative furnace and removed from the opposite end in the form of a molten finished glass after being subjected through the furnace to fusion, refining and cooling to a working temperature. It has been long suggested to mount a burner in the roof of a glass melting furnace. It has also been common to use an oxygen-fuel burner in the glass melting furnaces in which pure oxygen is used in place of air as the oxidant in the burner.

Roof mounted burners used in glass melting furnaces may be seen in U.S. Pat. No. 3,129,930 for a mobile roof burner system for heating of open hearth furnaces and in U.S. Pat. No. 3,337,324 for a process for melting and refining glass batch materials. U.S. Pat. No. 4,816,056 is for a process of heating and agitating multi-stage melting and refining of glass in which the burner flame impinges upon the surface of the glass.

Roof mounted oxygen/fuel burner systems for glass melting furnaces may be seen in the following U.S. Patents.

U.S. Pat. No. 4,604,123 is for a process and installation for heating molten glass flowing through a channel having a vault therein with a roof top mounted oxyfuel burner.

U.S. Pat. No. 5,139,558 is for a roof mounted auxiliary oxygen-fired burner in a glass melting furnace mounted in the roof of a cross-fired regenerative furnace.

U.S. Pat. No. 6,237,369 is for a roof mounted oxygen-fuel burner for a glass melting furnace. The fuel and the oxygen are controlled so that the velocities of both are substantially equivalent to provide a generally laminar gaseous fuel and oxygen flow.

U.S. Pat. No. 6,422,041 is for a method of boosting a glass melting furnace using a roof mounted oxygen-fuel burner in order to increase production capacity.

U.S. Pat. No. 6,540,508 is a process of installing a roof mounted oxygen-fuel burner in a glass melting furnace.

U.S. Pat. No. 6,705,117 is a method of heating a glass melting furnace using a roof mounted staged combustion oxygen-fuel burner.

U.S. Pat. No. 6,705,118 is for a method of boosting a glass melting furnace using a roof mounted oxygen-fuel burner.

Applicant's prior U.S. Pat. No. 5,302,112 is for a combustion burner apparatus having independent flow streams, one for an oxidizer and one for a fuel with an adjustable control capability to permit various flame configurations and reproducible combustion rates at different oxidizer and gaseous fuel flow rates. The burner block uses a primary and a secondary oxidizer passageway positioned at angles. The burner also has a gaseous fuel supply separated into primary and secondary fuel paths. Applicant's prior U.S. Pat. No. 5,554,022 is for a burner apparatus for the combustion of fuel and oxygen in which the burner flame pattern can be controlled as to the shape and position within the combustion chamber.

The present invention is for an oxygen fuel burner in the roof of a glass melting furnace which can vary the shape of the flame and which can produce a moving flame pattern, also referred to as sweeping or to sweep, as desired. The burner has a housing having an oxygen inlet pipe coupled to an oxygen chamber in the housing and a fuel inlet pipe coupled to a burner nozzle in the housing. The fuel is fed to the nozzle fuel port through a crossover set of channels while the oxygen chamber feeds a plurality of nozzle oxygen ports. The oxygen port outlets are each angled toward the fuel port outlet. A rotating impeller in the housing oxygen chamber over the oxygen ports has a notched or partial opening that causes a variable moving or sweeping flame in the burner as the impeller rotates. The impeller can also be raised or lowered to control the flow of oxygen to the plurality of oxygen port outlets to control the shape of the burner flame.

SUMMARY OF THE INVENTION

This invention relates to an oxygen-fuel burner for a glass melting furnace. A burner housing has an oxygen supply line and a fuel supply line coupled thereto. A burner nozzle is attached to the housing and has a centralized fuel port for feeding fuel from the coupled fuel line to a fuel nozzle outlet and has a plurality of spaced oxygen ports positioned around the centralized fuel port, each oxygen port having the outlet portion thereof angled towards the central fuel port outlet. An impeller has a notched or open area and is rotatably mounted in the housing over the plurality of oxygen ports. The impeller is shaped with a notched or open area so as to open at least one port at a time as the impeller rotates over the oxygen ports. The rotating impeller can thereby open and close oxygen ports to control the flow of oxygen thereinto as the impeller rotates over the inlets to the ports to provide a variable moving or sweeping output of oxygen around the fuel port to provide a variable moving or sweeping flame from the burner nozzle in the furnace. A motor is mounted to the housing and has a motor shaft coupled to an impeller shaft for rotating the impeller. The motor to impeller shaft coupling is vertically adjustable to raise and lower the impeller to allow a limited flow of oxygen around the impeller into the oxygen ports while the impeller opening notch sweeps the ports and flame. This allows for the adjustment of the flame that is being swept around the furnace. The oxygen-fuel burner can produce a shaped flame in the furnace as the selected oxygen ports are opened and closed around the fuel port.

BRIEF DESCRIPTION OF THE DRAWINGS

The accompanying drawings, which are included to provide further understanding of the invention, are incorporated in and constitute a part of the specification and illustrate an embodiment of the invention and together with the description serve to explain the principles of the invention.

In the drawings.

DETAILED DESCRIPTION OF AN EXEMPLARY EMBODIMENT

The present invention is for an oxygen and fuel burner 20 in the roof 21 of a glass melting furnace and especially to an oxygen-fuel burner 20 which can vary the flame in the furnace and provide a variable moving or sweeping flame over the melted glass in the furnace.

Figure 1:
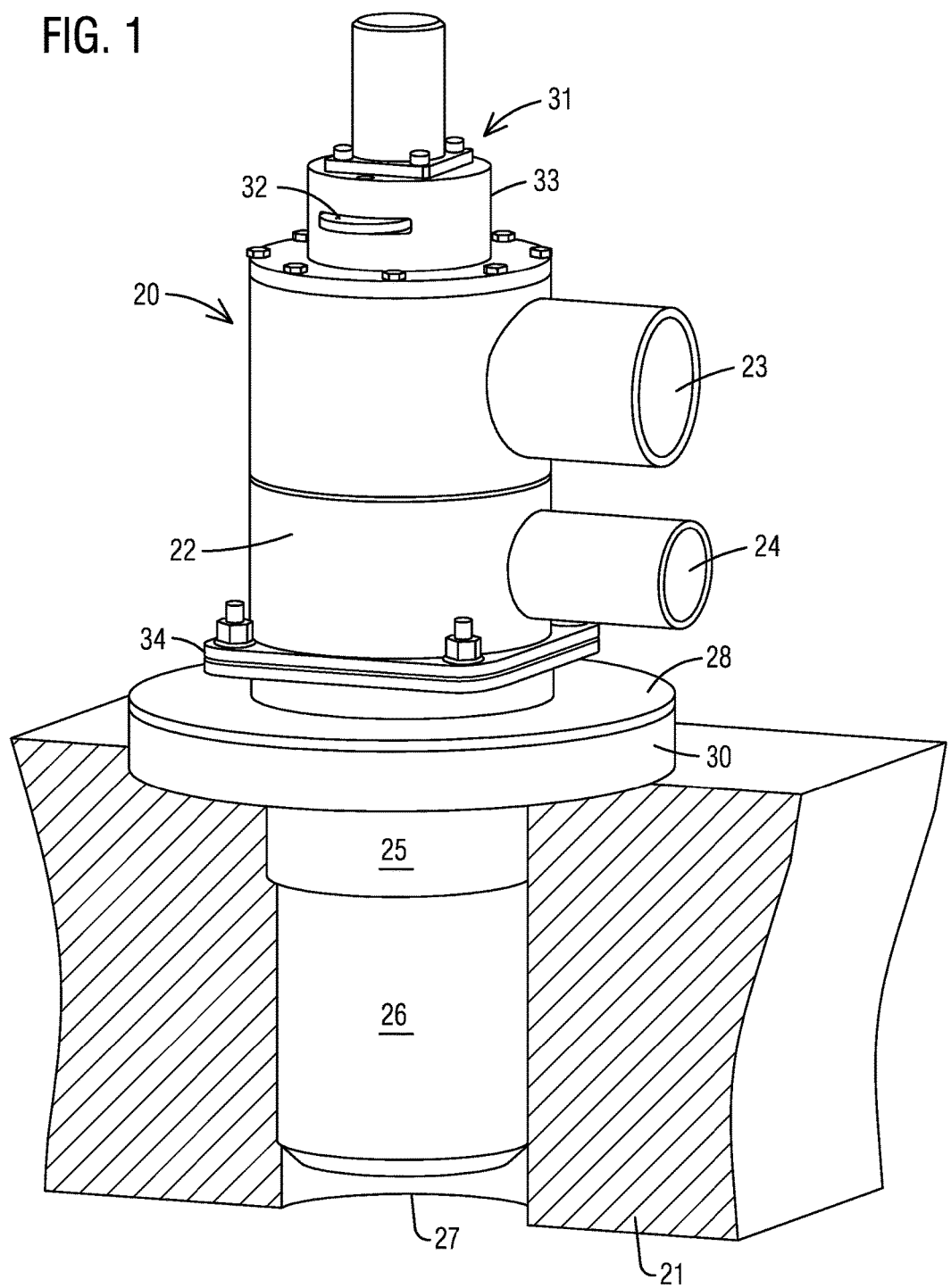
FIG. 1 is a perspective view of an oxygen fuel burner mounted in the roof of a glass melting furnace in accordance with the present invention.
Figure 2:
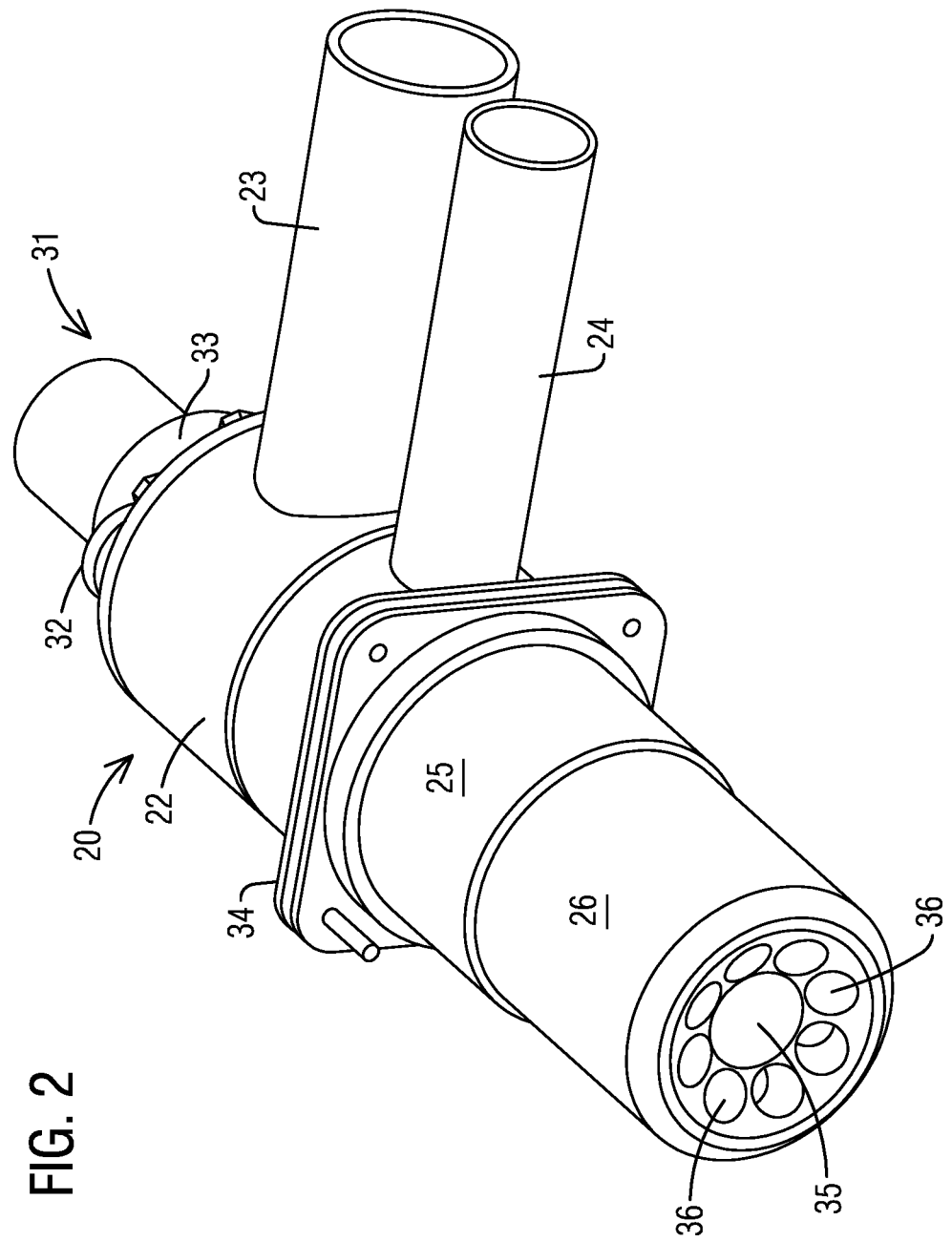
FIG. 2 is a perspective view of an oxygen fuel burner of FIG. 1.

Referring to the drawings and especially to FIGS. 1 and 2, an oxygen-fuel burner 20 is shown mounted in the roof 21 of a glass melting furnace. The burner 20 has a housing 22 with an oxygen supply line 23 and a fuel supply line 24 for feeding a fuel, such as a gas fuel. The housing 22 has a burner location alignment pin 25 having a burner nozzle 26 attached thereto. The nozzle extends into an opening 27 in the furnace roof 21. The burner 20 sits on a burner support and seal bracket 28 resting on a fiber blanket seal 30. A motor 31 is attached to the top of the housing 22 and has a manual flame adjustment knob 32 extending from the motor 31 to the impeller motor mount assembly 33. The housing 22 has a burner flange 34. As more clearly seen in FIG. 2, the burner nozzle 26 has a central fuel port 35 outlet surrounded by a plurality of oxygen ports 36 outlets.

Figure 3:
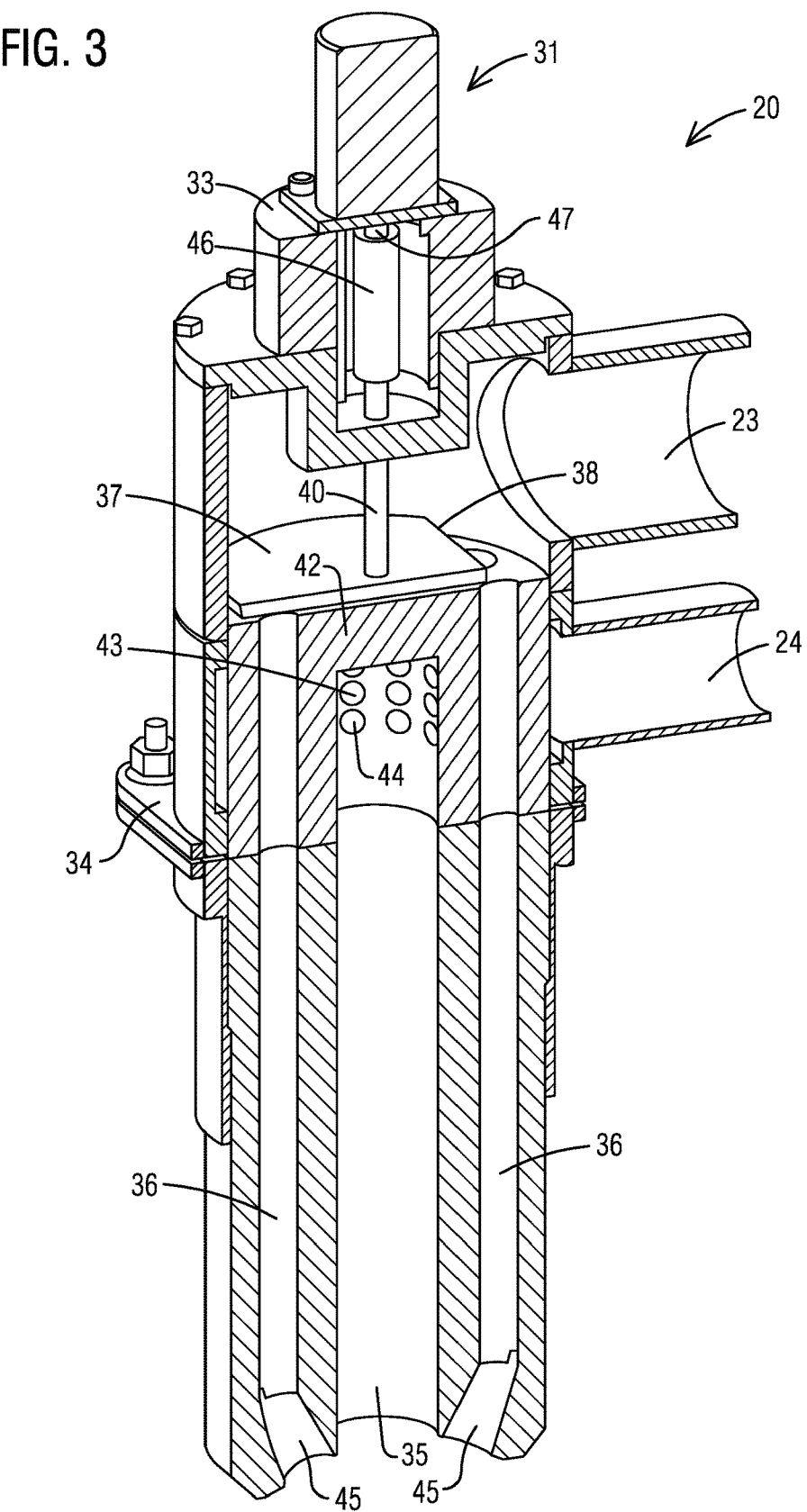
FIG. 3 is a sectional view taken through the burner of FIGS. 1-2.

As more clearly seen in FIG. 3, the housing 22 has the oxygen ports 36 inlets partially covered by an impeller 37. The impeller 37 has a notched portion which does not cover one or more oxygen port 36 inlets as the impeller 37 rotates. Thus the impeller 37 rotates to form a variable moving or sweeping action of opening and closing the oxygen ports 36 as it rotates. The impeller 37 is shown in this figure as having the flat or notched portion 38 to provide the uneven distribution of oxygen into the ports 36. The oxygen line 23 can be seen feeding the oxygen into an area or chamber above the impeller 37 and ports 36. A stem or shaft 40 supports the impeller 37 and is coupled to the motor 31. The impeller shaft is capable of moving the impeller 37 up or down as well as rotating the impeller 37 for adjusting the shape of the flame from the burner nozzle 36. The impeller 37 is raised and lowered by the shaft 40 by rotating the adjustment knob 32 in the motor mount assembly 33. Raising the impeller 37 will allow oxygen to flow around the impeller into all the oxygen ports 36 but in a lesser amount than that flowing through the ports that are opened by the notched portion 38 which allows the full opening of a sweep of port 36 inlets as the impeller 37 rotates.

Figure 4:
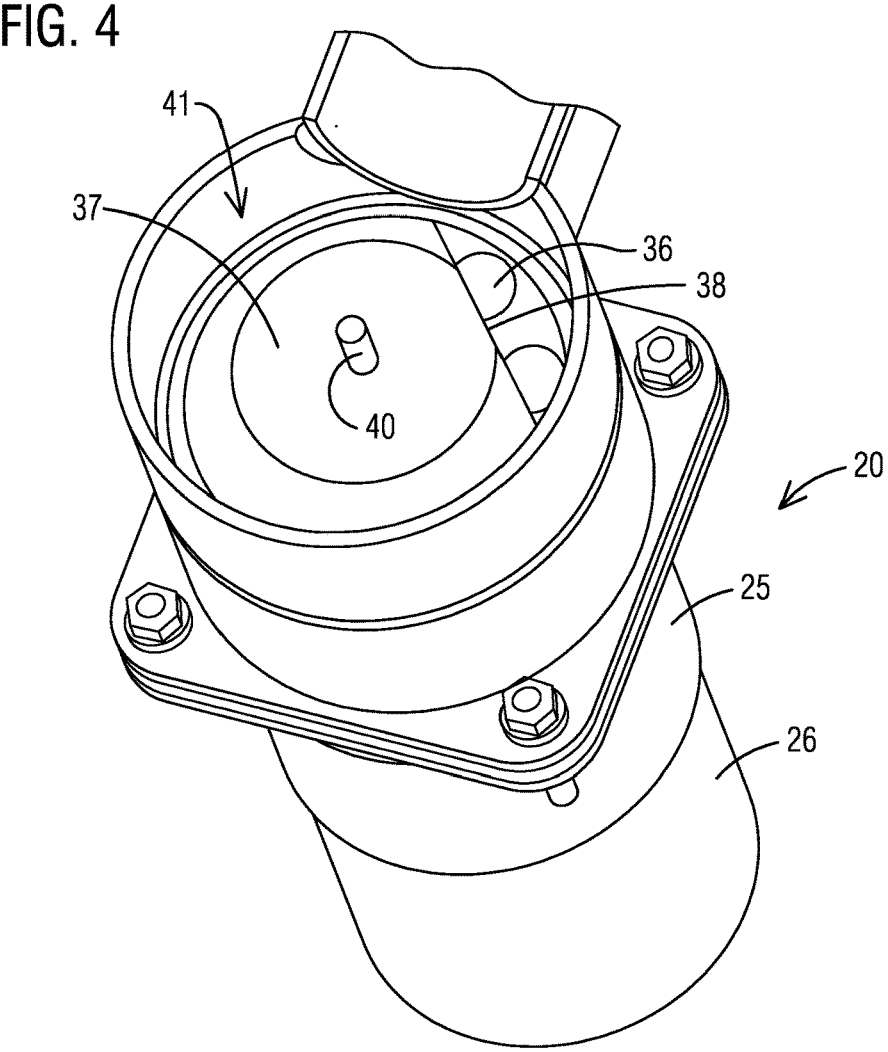
FIG. 4 is a cut-away perspective view showing the impeller over the oxygen ports of the burner of FIGS. 1-3.

The operation of the burner 20 can be more clearly seen in connection with FIGS. 3 to 4. The burner housing 22 has an oxygen delivery chamber 41 and a gas fuel feed block 42. The oxygen flows into the chamber 41 from the oxygen line 23 where it is metered into the oxygen ports 36 by the position and rotation of the impeller 37. The gas fuel feed block 42 receives the gas fuel from the fuel line 24 and feeds the gas into the fuel port 35 through the port crossover design 43 which has a plurality of feed passageways 44 spaced around the crossover top 43. As seen in FIG. 3, the oxygen ports 36 are each angled at the ends thereof with angle portions 45 to direct the oxygen from each port towards the fuel port 35 outlet.

The coupling of the impeller 37 to the motor 31 is shown in FIG. 3 in which the impeller 37 stem 40 is coupled to the motor 31 with a motor shaft coupling 46 located in the motor mount assembly 33. The impeller shaft 40 is attached to the coupling on one end while the motor 31 shaft 47 is coupled at the other end. The thumb wheel 32 is used to manually move the motor mount assembly 33 up or down to raise or lower the motor mount assembly 33 along with the motor 31 and shaft coupling 46 to raise or lower the impeller 37. This is a manual adjustment but it should be clear that it can also be motorized as desired.

Figure 5:
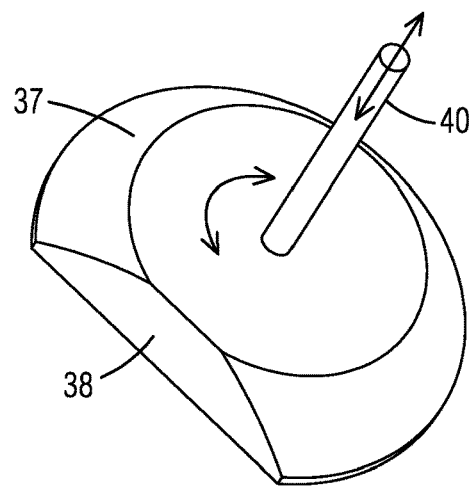
FIG. 5 is a perspective view of the burner impeller showing the impeller sweep and lateral movements.

FIG. 4 shows a portion of the burner with the impeller having the truncated edge 38 leaving some oxygen ports 36 inlets open while closing other ports 36. A variable moving or sweeping action of the flame of the burner is accomplished by the rotation of the impeller at different speeds as desired. The flow into the oxygen ports as well as the shape of the flame can also be controlled by the raising or lowering of the impeller 37 with the impeller shaft 40 to allow leakages around the impeller 37 into all oxygen ports 36. This then provides a different ratio of oxygen flowing into the oxygen ports between the open and closed ports while also providing a variable moving or sweeping action to the flame from the burner as the impeller 37 rotates. FIG. 5 shows the impeller 37 having the shaft 40 and the notched area 38 with arrows to show the movement of the impeller 37. However it will be understood that the notch 38 can be of any shape desired including having an opening in the impeller to open up oxygen ports 36 through or past the impeller 37 without departing from the spirit and scope of the invention.

Figure 6:
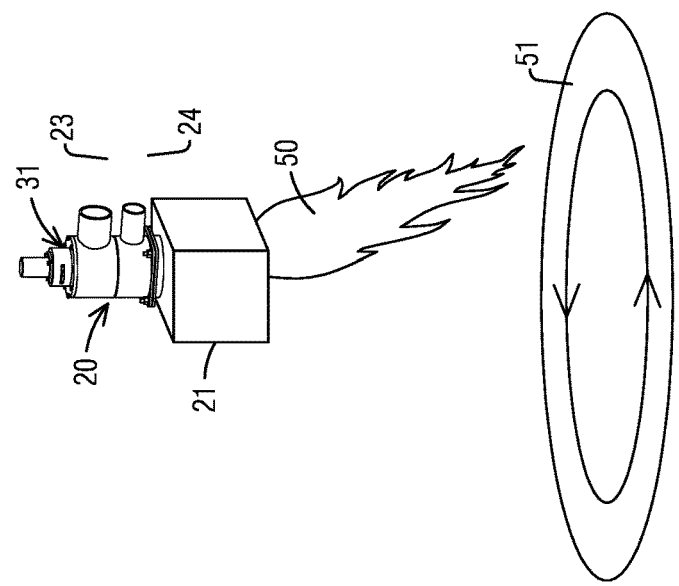
FIG. 6 is diagrammatic view of a fixed flame having no impeller movement extending from the present burner.
Figure 7:
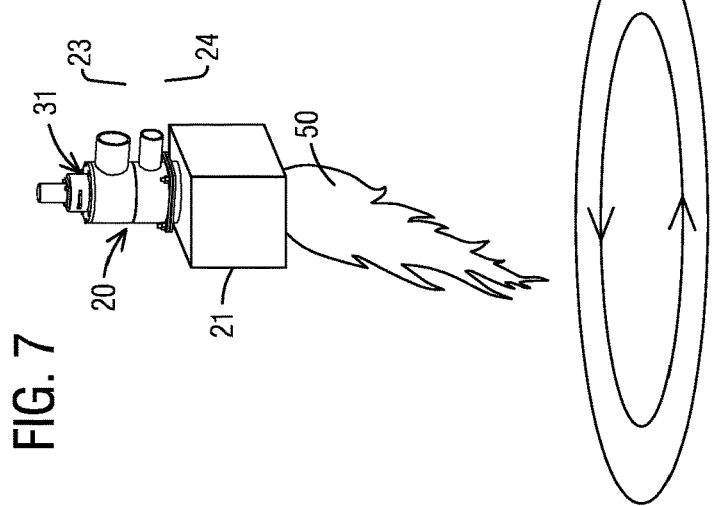
FIG. 7 is diagrammatic view of a limited path of travel of the flame extending from the present burner.
Figure 8:
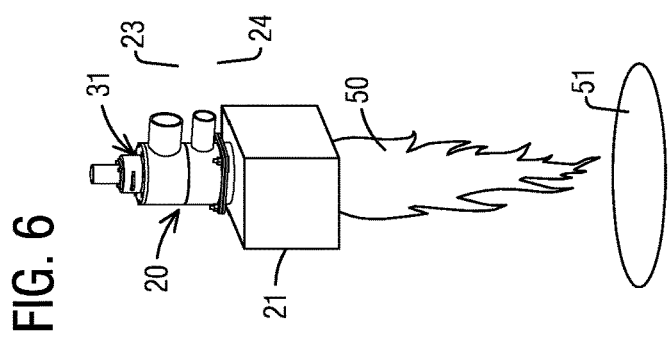
FIG. 8 is diagrammatic view of a full circular sweep of the flame extending from the present burner.

FIGS. 6, 7 and 8 illustrate typical modes of operation of the present burner. Each figure has the burner 20 attached to the crown or roof 21 of a glass melting furnace and has the motor 31 and the oxygen supply line 23 and the fuel supply line 24 attached thereto. In FIG. 6 the flame 50 is fixed with no movement for heating the glass 51 while in FIG. 7 the flame 50 has a limited path of travel. In FIG. 8 the flame 50 has a full circular path of travel making a full sweep for heating the glass 51.

It should be clear at this time that an apparatus for an oxygen fuel burner for a glass furnace has been provided. However the present invention is not to be considered limited to the forms shown which are to be considered illustrative rather than restrictive.

We claim:

1. An oxygen-fuel burner for a glass melting furnace comprising:
    a burner housing having an oxygen supply line coupled thereto for feeding oxygen thereto and a fuel supply line coupled thereto for feeding fuel thereto;
    a nozzle attached to said housing, said nozzle having a centralized fuel port for feeding fuel from said fuel supply line to a fuel nozzle outlet and a plurality of spaced oxygen ports positioned around said centralized fuel port each having an oxygen nozzle outlet angled towards said fuel port outlet;
    an impeller rotatably mounted in said housing over said plurality of oxygen ports and shaped to open at least one port at a time as said impeller rotates thereover to thereby open and close said oxygen ports and the flow of oxygen thereto as said impeller is rotated to provide a variable moving output of oxygen around said nozzle fuel port from said burner nozzle oxygen ports; and
    a motor mounted to said housing and coupled to said impeller for rotating said impeller;

whereby said oxygen-fuel burner can produce a variable moving or sweeping flame as selected oxygen ports are opened to allow the selected flow of oxygen around said centralized fuel port.

2. The oxygen-fuel burner in accordance with claim 1 in which said impeller has a shaft extending therefrom coupled to a motor shaft for rotation of said impeller when said motor is actuated.

3. The oxygen-fuel burner in accordance with claim 2 in which said impeller is notched on one side to open at least one of said plurality of oxygen ports as said impeller notched area is rotated over said plurality of oxygen ports.

4. The oxygen-fuel burner in accordance with claim 3 in which said impeller shaft can be raised and lowered to vary the oxygen flow to all ports as said impeller is rotated to allow a greater flow into selected ports to thereby allow the shaping of the flame from said burner.

5. The oxygen-fuel burner in accordance with claim 4 in which said oxygen supply line feeds oxygen into an oxygen housing chamber above said impeller and said burner oxygen ports and into said burner oxygen ports.

6. The oxygen-fuel burner in accordance with claim 5 in which said fuel supply line feeds fuel into a fuel feed block having a plurality of passageways coupled to said burner fuel port.

7. The oxygen-fuel burner in accordance with claim 6 having a coupling mounted in said motor mount housing coupling motor shaft and said impeller shaft.

8. The oxygen-fuel burner in accordance with claim 7 in which said motor mount has a threaded rod running therethrough coupled to a threaded knob for raising and lowering said motor mount housing and coupling therein by rotation of said knob to raise or lower said impeller.

9. The oxygen-fuel burner in accordance with claim 6 in which said burner fuel port has a crossover cap having a plurality of openings coupled to said plurality of passageways in said fuel feed block.

10. An oxygen-fuel burner for a glass melting furnace comprising:
    a burner housing having an oxygen supply line coupled to a burner housing oxygen chamber therein for feeding oxygen thereinto and having a fuel supply line coupled to a fuel feeding block in said burner housing, said fuel feeding block having a plurality of passageways therein;
    a burner nozzle attached to said burner housing, said nozzle having a centralized fuel port coupled to said fuel feeding block plurality of passageways for feeding fuel from said fuel supply line to a fuel nozzle centralized fuel port and a plurality of spaced oxygen ports open to said oxygen housing chamber and positioned around said centralized fuel port, each oxygen port having an oxygen nozzle outlet angled towards said centralized fuel port outlet;
    an impeller rotatably mounted in said oxygen housing chamber over said plurality of oxygen ports and shaped to control the flow of oxygen into each oxygen port, said impeller shaped to open at least one port at a time as said impeller rotates thereover to provide a variable moving output of oxygen around said centralized fuel port outlet; and
    a motor mounted to said housing and coupled to said impeller for rotating said impeller, said motor being movably mounted to said housing for raising or lowering said motor and coupled impeller;
    whereby said oxygen-fuel burner can produce a shaped flame by the control of the oxygen fed to selected oxygen ports.

11. The oxygen-fuel burner in accordance with claim 10 in which said impeller has a shaft extending therefrom coupled to a motor shaft for rotation of said impeller when said motor is actuated.

12. The oxygen-fuel burner in accordance with claim 11 in which said impeller is notched on one side to open at least one of said plurality of oxygen ports as said impeller notched area is rotated over said plurality of oxygen ports.

13. The oxygen-fuel burner in accordance with claim 12 in which said burner housing has a motor mount having said motor attached thereto, said motor mount having a threaded connection for moving said motor mount, motor and connected impeller rod relative to said burner housing for adjusting the position of said impeller.

14. The oxygen-fuel burner in accordance with claim 10 in which said burner centralized fuel port has a crossover top portion having a plurality of openings coupled to said plurality of passageways in said fuel feed block.

* * * * *